US012768416B2

(12) United States Patent
Yu et al.

(10) Patent No.: US 12,768,416 B2
(45) Date of Patent: Oct. 20, 2026

(54) WEAR MONITORING SYSTEM, MOTOR AND ELEVATOR

(71) Applicant: KONE CORPORATION, Helsinki (FI)

(72) Inventors: Bo Yu, Kunshan (CN); Jinming Wang, Kunshan (CN); Minmin Shao, Kunshan (CN); Hengyuan Gao, Kunshan (CN); Shuaichao Zhao, Kunshan (CN)

(73) Assignee: KONE CORPORATION, Helsinki (FI)

( * ) Notice: Subject to any disclaimer, the term of this patent is extended or adjusted under 35 U.S.C. 154(b) by 912 days.

(21) Appl. No.: 18/112,844

(22) Filed: Feb. 22, 2023

(65) Prior Publication Data

US 2023/0265901 A1 Aug. 24, 2023

(30) Foreign Application Priority Data

Feb. 23, 2022 (CN) ........................ 202210166435.8

(51) Int. Cl.
*F16D 66/02* (2006.01)
*B66B 1/32* (2006.01)
*B66B 5/00* (2006.01)

(52) U.S. Cl.
CPC .............. *F16D 66/024* (2013.01); *B66B 1/32* (2013.01); *B66B 5/0031* (2013.01)

(58) Field of Classification Search
CPC ........... B66B 1/32; B66B 5/0031; B66B 5/02; B66B 5/0018
See application file for complete search history.

(56) References Cited

U.S. PATENT DOCUMENTS 7,909,145 B2 * 3/2011 Erny ........................ B66D 5/30
188/1.11 E
8,011,481 B2 * 9/2011 Erny ..................... F16D 66/025
188/1.11 E (Continued)

FOREIGN PATENT DOCUMENTS

| | | | |
|---|---|---|---|
| CN | 217297103 | U | 8/2022 |
| JP | 2004-99209 | A | 4/2004 |
| KR | 1999-0041205 | A | 6/1999 |

OTHER PUBLICATIONS

Chinese Office Action and Search Report for Chinese Application No. 202210166435.8, dated Jul. 1, 2025, with English translation of the Office Action.

*Primary Examiner* — Rina I Duda
(74) *Attorney, Agent, or Firm* — Birch, Stewart, Kolasch & Birch, LLP

(57) ABSTRACT

The invention discloses a wear monitoring system for a brake device of a motor. The brake device includes a brake disc and a brake magnet movable relative to the brake disc. The wear monitoring system includes a first arm portion including a first free end and arranged to be moved with the brake magnet so that the first free end always contacts the bottom of the brake magnet, a second arm portion arranged to be moved with the first arm portion and including a second free end; and a trigger device including a trigger button that is triggered by the second free end of the second arm portion when the wear amount of the brake magnet reaches a first threshold or a multiple of the first threshold and when the brake magnet and the brake disc are in an attracted state. A motor and an elevator are also disclosed.

16 Claims, 4 Drawing Sheets

(56) References Cited

U.S. PATENT DOCUMENTS

| | | | | |
|---|---|---|---|---|
| 9,353,814 | B2 * | 5/2016 | Seglo | F16D 66/025 |
| 10,023,428 | B2 * | 7/2018 | May | B66B 5/0031 |
| 2016/0280511 | A1 * | 9/2016 | Anderson | B66B 5/04 |
| 2017/0067943 | A1 * | 3/2017 | Kattainen | G01R 19/0038 |
| 2018/0362291 | A1 * | 12/2018 | Studer | B66B 5/0031 |

* cited by examiner

WEAR MONITORING SYSTEM, MOTOR AND ELEVATOR

TECHNICAL FIELD

The invention relates to a wear monitoring system, which is used for a braking device of a motor, and more specifically for a motor of an elevator. The invention also relates to an elevator comprising such a wear monitoring system.

BACKGROUND

In the prior art, a device for monitoring the wear amount of a brake magnet of a motor brake device only allows monitoring a certain single wear amount, but manual measurement is required for other wear amounts that need to be monitored, which is time-consuming and labor-intensive, involves high labor cost and poor reliability, and cannot effectively ensure safety.

Therefore, a new wear monitoring system is needed, which can at least overcome the above defect in the prior art.

SUMMARY

To this end, according to a first aspect of the present invention, a wear monitoring system is proposed for a braking device of a motor.

The braking device comprises a brake disc which is fixedly arranged, and a brake magnet which is movable relative to the brake disc to switch between an attracted state in which the brake magnet is attracted to the brake disc and a separated state in which the brake magnet is separated from the brake disc, wherein the wear monitoring system comprises:

- a fixedly arranged support;
- a first arm portion including a first free end and arranged to be moved with the brake magnet so that the first free end always contacts the bottom of the brake magnet,
- a second arm portion arranged to be moved with the first arm portion and including a second free end,
- a trigger device comprising a trigger button which is set to be triggered by the second free end of the second arm portion when the wear amount of the brake magnet reaches a first threshold or a multiple of the first threshold and is smaller than a second threshold larger than the first threshold, and when the brake magnet and the brake disc are in the attracted state.

Thus, the wear monitoring system provided by the invention achieves automatic monitoring of the wear state of the brake magnet without the need of manual measurement and therefore saves the cost; meanwhile, by triggering the button when the wear amount of the brake magnet reaches the first threshold or a multiple of the first threshold, the indication of the wear amount is given, so that more reliable wear monitoring is achieved and the safety is enhanced.

The wear monitoring system of the present invention may also include one or more of the following further improvements.

In some embodiments, the wear monitoring system further comprises an adjustable positioning member for defining a separation position of the brake magnet in the separation state.

In some embodiments, when the brake magnet is not worn, the brake magnet is separated from the brake disc by a first distance in the separated state; for each time that the trigger button is triggered, the positioning member is adjusted by the first threshold value, so that the brake magnet and the brake disc are separated by the first distance in the separated state.

In some embodiments, the trigger device is arranged to be able to be displaced relative to the support by a displacement amount that is associated with the first threshold value each time the trigger button is triggered.

In some embodiments, the wear monitoring system further comprises a fixed positioning block, wherein when the trigger device is shifted to a position contacting the positioning block, the wear amount of the brake magnet reaches the second threshold.

In some embodiments, the first arm portion and the second arm portion are both integrally formed parts of a single arm, and the single arm is arranged to be able to pivot around an axle pin fixedly arranged on the support to generate the movement of the second arm portion with the first arm portion.

In some embodiments, the length of the first arm portion is shorter than the length of the second arm portion.

In some embodiments, a counterweight is provided at the second free end, and configured to apply a trigger force for triggering the trigger button.

In some embodiments, the first free end is provided with a ball in contact with the bottom of the brake magnet.

In some embodiments, the support is provided with a first guide part, and the trigger device is provided with a second guide part which cooperates with the first guide part to move the trigger device relative to the support.

In some embodiments, the first guide part is a groove or a screw, and the second guide part is a screw or a groove accordingly.

In some embodiments, the positioning member is a screw that can be screwed in and out relative to the housing of the motor.

In some embodiments, the first threshold is 0.5 mm, and/or the second threshold is 2.1 mm.

According to a second aspect of the present invention, a motor is proposed, which includes the wear monitoring system according to the foregoing.

According to a third aspect of the present invention, an elevator is proposed, which includes the wear monitoring system or motor according to the foregoing.

In some embodiments according to the third aspect of the present invention, in the elevator, the trigger button is associated with a safety circuit of the elevator, and when the trigger button is triggered, the safety circuit functions to stop the elevator.

BRIEF DESCRIPTION OF THE DRAWINGS

In order to explain the technical solutions of the embodiments of the present disclosure more clearly, the following will briefly introduce the drawings that need to be used in the embodiments. It should be understood that the following drawings only show certain embodiments of the present disclosure, and therefore should not be regarded as a limitation of the scope of protection. For those of ordinary skill in the art, other relevant drawings can be obtained based on these drawings without creative work. In the drawings.

DETAILED DESCRIPTION

Figure 1:
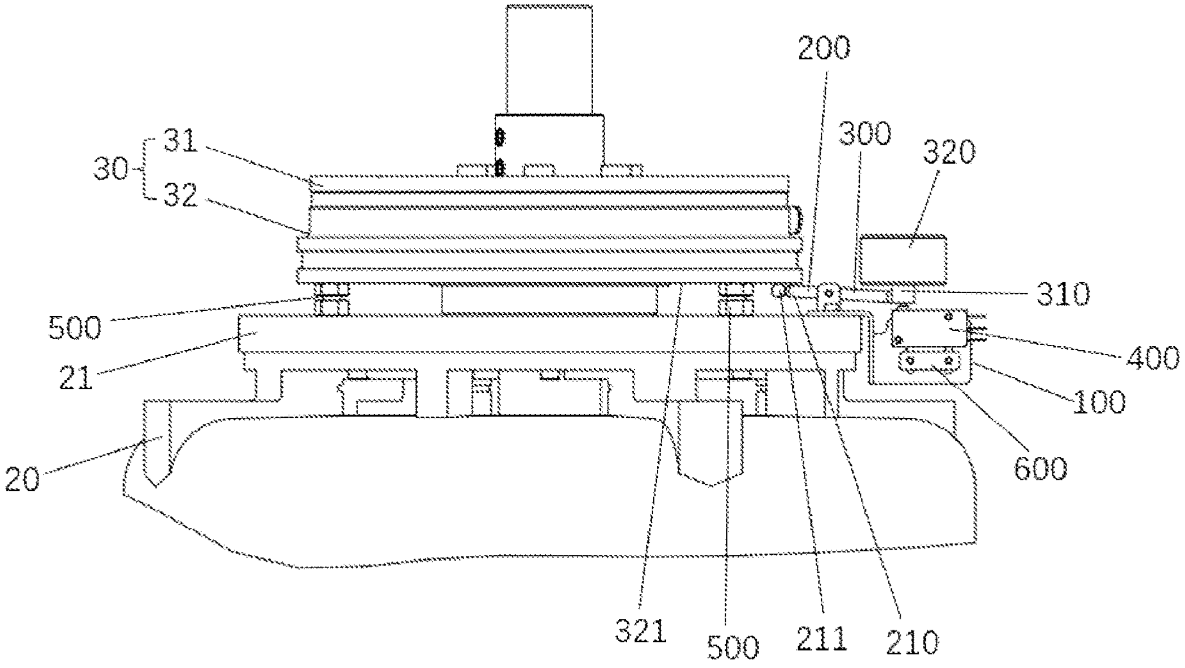
FIG. 1 is a front view of a wear monitoring system assembled with a braking device according to an embodiment of the present invention.
Figure 2:
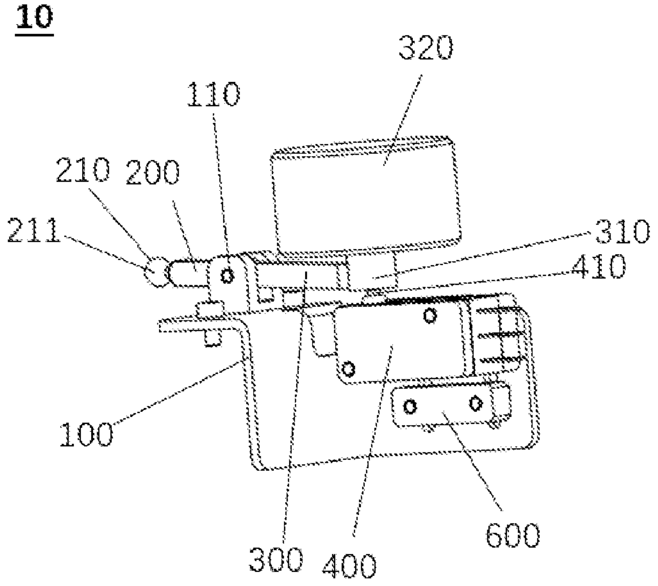
FIG. 2 is a first perspective view of the wear monitoring system in FIG. 1.

Next, a wear monitoring system according to an embodiment of the present disclosure will be described in detail with reference to the accompanying drawings. In order to make the objectives, technical solutions, and advantages of the present disclosure clearer, the technical solutions of the embodiments of the present disclosure will be described clearly and completely in conjunction with the accompanying drawings of the embodiments of the present disclosure. Obviously, the described embodiments are part of the embodiments of this disclosure, but not all of them.

Therefore, the following detailed description of the embodiments of the disclosure provided in conjunction with the accompanying drawings is not intended to limit the scope of the claimed disclosure, but only represents selected embodiments of the disclosure. Based on the described embodiments of the present disclosure, all other embodiments obtained by those of ordinary skill in the art without inventive work are within the protection scope of the present disclosure.

Unless the context requires otherwise, the singular includes the plural. Throughout this specification, the terms "including", "comprising", "having", etc. are used herein to specify the presence of stated features, numbers, steps, operations, elements, components or combinations thereof, but do not exclude the presence or addition of one or more other features, numbers, steps, operations, elements, components or combinations thereof.

In addition, even though terms including ordinal numbers such as "first" and "second" can be used to describe various components, these components are not limited by these terms, and these terms are only used to distinguish one element from other elements. For example, a first component may be referred to as a second component, and similarly, a second component may be referred to as a first component without departing from the scope of the present disclosure.

In the description of this disclosure, it should be understood that orientations and positional relationships that the terms 'center', 'longitudinal', 'lateral', 'upper', 'lower', 'front', 'rear', 'left', 'right', 'vertical', 'horizontal', 'top', 'bottom', 'inside' and 'outside' etc. are based on the orientations and positional relationships shown in the drawings and only for convenience of describing the present disclosure and simplifying the description, rather than indicating or implying that the device or element referred to must have a specific orientation, be configured and operated in a specific orientation, and therefore cannot be understood as a limitation of the present disclosure.

As shown in FIGS. 1-5, a wear monitoring system 10 according to an embodiment of the present invention is used for a brake device 30 of a motor 20, and more specifically for monitoring the wear state of the brake device 30 of the motor 20. The braking device 30 includes a fixed brake disc 31 and a brake magnet 32 which is arranged to be movable relative to the brake disc 31 to switch between an attracted state in which the brake magnet 32 is attracted to the brake disc 31 and a separated state in which the brake magnet 32 is separated from the brake disc 31. In a specific embodiment, the brake magnet 32 and the motor 20 form a toothed fit, and the brake magnet 32 can freely slide up and down relative to the motor 20 along the teeth. More specifically, when the power is cut off, the magnetism of the brake magnet 32 urges it to be attracted to the brake disc 31, and the friction between the brake magnet 32 and the brake disc 31 produces a braking effect, so that the motor 20 can no longer operate; when the power is turned on, the magnetism of the brake magnet 32 disappears, making the brake magnet 32 separated from the brake disc 31 under the action of gravity, and therefore no longer play a braking role, allowing the motor 20 to operate.

With the use of the brake device 30, the brake magnet 32 of the brake device 30 will be worn due to the friction with the brake disc 31. More specifically, when the brake magnet 32 is not worn, the brake magnet 32 is separated from the brake disc 31 by a first distance in the separated state; however, with the generation of wear, the brake magnet 32 will be separated from the brake disc 31 by a second distance greater than the first distance in the separated state. When the wear of the brake magnet 32 reaches a certain level, it will affect the effective attraction between the brake magnet 32 and the brake disc 31, thus affecting the braking effect of the brake device 30, resulting in potential safety hazards. Therefore, it is necessary to monitor the wear amount of the brake magnet 32 to ensure that the brake device 30 can operate effectively and thus ensure safety. Therefore, the present invention aims to propose a wear monitoring system 10, which can automatically monitor the wear state of the brake magnet 32 without manual measurement, and trigger a button to give an indication on the wear amount when the wear amount of the brake magnet 32 reaches a first threshold or a multiple of the first threshold, thus achieving more reliable wear monitoring, enhancing safety and saving cost.

As shown in FIGS. 1-5, according to some embodiments, the wear monitoring system includes a support 100 fixedly arranged, a first arm portion 200, a second arm portion 300 and a trigger device 400, as will be described in detail below.

As shown in FIGS. 1-5, the first arm portion 200 includes a first free end 210 and is configured to be moved with the brake magnet 32 so that the first free end 210 is always in contact with the bottom portion 321 of the brake magnet 32. In a more specific embodiment, the first free end 210 of the first arm portion 200 may be provided with a ball 211 for contacting with the bottom 321 of the brake magnet 32, which can ensure that the first free end 210 always keeps good contact with the brake magnet 32 during the whole working process. The second arm portion 300 is configured to be moved with the first arm portion 200 and includes a second free end 310. In a more specific embodiment, both the first arm portion 200 and the second arm portion 300 may be integrally formed as parts of a single arm which is arranged to be able to pivot around an axle pin 110 fixedly arranged on the support 100, so as to generate the movement of the second arm portion 300 with the first arm portion 200. That is, the middle section of the single arm may be provided with a hole into which the axle pin 110 of the support 100 is inserted in the assembled state, so as to allow the pivoting movement of the single arm around the axle pin 110, which enables the first arm portion 200 and the second arm portion 300 to form a structure similar to a seesaw. This realizes a very simple and compact structure, saves manufacturing, installation and assembly costs and saves space. It should be noted that this specific embodiment is only exemplary and not restrictive, and any means that can realize the movement of one part with another are included in the protection scope of this application.

Figure 4:
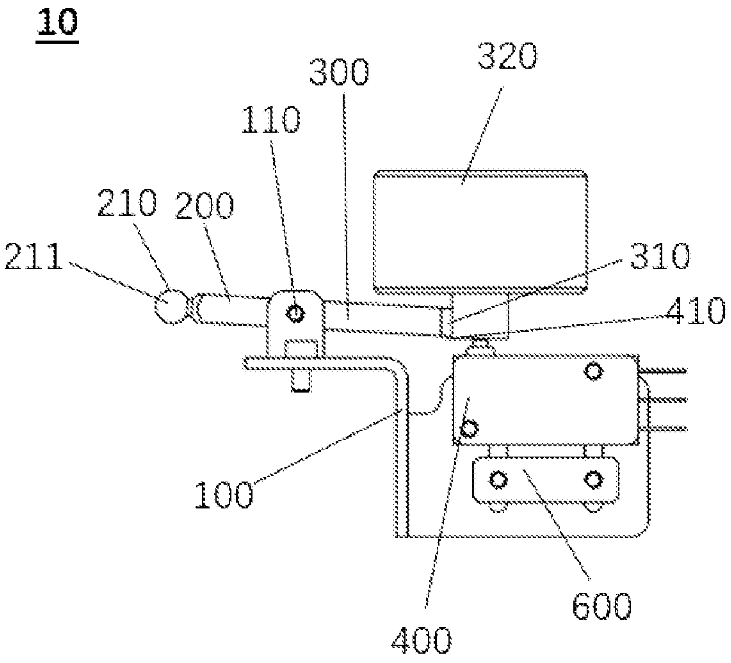
FIG. 4 is a first plan view of the wear monitoring system in FIG. 1.
Figure 5:
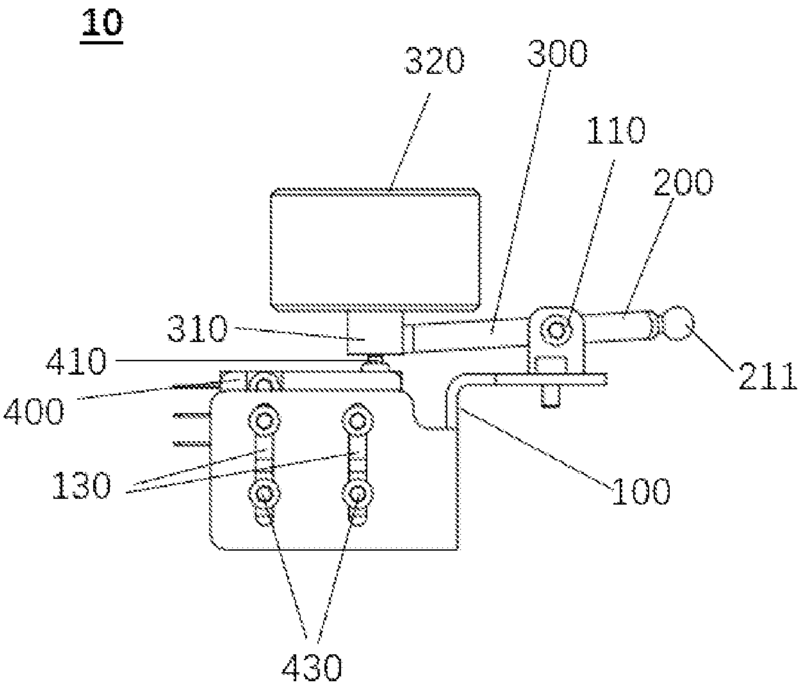
FIG. 5 is a second plan view of the wear monitoring system in FIG. 1.

As shown in FIG. 4-5, the trigger device 400 can be provided with a trigger button 410, which is provided to be triggered by the second free end 310 of the second arm portion 300 when the wear amount of the brake magnet 32 reaches a first threshold or a multiple of the first threshold and is smaller than a second threshold that is larger than the first threshold, and when the brake magnet 32 and the brake disc 31 are in the attracted state. That is, in this case, as the brake magnet 32 and the brake disc 31 are switched from the separated state to the attracted state, the first arm portion 200 can be moved with the brake magnet 32 via its first free end 210, and at the same time, the second arm portion 300 can be moved with the first arm portion 200 so that its second free end 310 can trigger the trigger button 410. In a more specific embodiment, the trigger button 410 may be associated with a safety circuit, and the trigger of the trigger button 410 may cause the safety circuit to be closed. In a specific embodiment, the wear monitoring system 10 is used in an elevator, and the triggering of the trigger button 410 can lead to the shutdown of the elevator through the safety circuit.

In a specific embodiment, the first threshold may be 0.4~0.6 mm, for example, 0.5 mm, and the second threshold may be 2.0~2.2 mm, for example, 2.1 mm. It should be noted, however, that such specific values are only exemplary and not restrictive, and specific values of the first threshold and the second threshold can be set according to actual needs.

In some embodiments, as shown in FIGS. 4-5, the length of the first arm portion 200 may be provided to be shorter than the length of the second arm portion 300. This allows the wear amount of the brake magnet 32 to be enlarged by the lever principle, which allows to reduce the monitoring error of the wear monitoring system 10 and increase its reliability.

In some embodiments, as shown in FIGS. 1-5, a counterweight 320 may be provided at the second free end 310 of the second arm portion 300, and configured to apply a trigger force for triggering the trigger button 410. More specifically, the presence of the counterweight 320 will allow the second free end 310 of the second arm portion 300 to exert sufficient trigger force on the trigger button 410 when the wear of the brake magnet 32 reaches the level that triggers the trigger button 410. In addition, the counterweight 320 also facilitates the first arm portion 200, and therefore the second arm portion 300, to be moved with the brake magnet 32 through the lever principle, ensuring that the first free end 210 moves with the brake magnet 32, thereby further ensuring the reliability of the wear monitoring system 10.

It should be noted that, in the above-mentioned embodiments and implementations, before the wear amount of the brake magnet 32 reaches the second threshold, each time the trigger button 410 is triggered, it is necessary to first adjust the distance of the brake magnet 32 relative to the brake disc 31 in the separated state to make it equal to the above-mentioned first distance again, and then reset the trigger button 410.

To this end, as shown in FIG. 1, in some embodiments, the wear monitoring system 10 may further include an adjustable positioning member 500, which may be used to define the separation position of the brake magnet 32 in the separated state. In addition, each time that the trigger button 410 is triggered, that is, when the wear amount of the brake magnet 32 reaches a first threshold or a multiple of the first threshold, the positioning member 500 can be adjusted, more specifically, be adjusted at the first threshold, so that the brake magnet 32 and the brake disc 31 are separated by the first distance again in the separated state. In some more specific embodiments, the positioning member 500 is a screw that can be screwed in and out with respect to the housing 21 of the motor 20, and the separation distance of the brake magnet 32 in the separation state is changed according to the amount of screwing in or screwing out. In this way, the dual functions of limiting the separation position of the brake magnet 32 and adjusting its separation distance from the brake disc 31 can be achieved with a very simple structure of the positioning member 500.

In a more specific embodiment, each time the trigger button 410 is triggered, that is, when the wear amount of the brake magnet 32 reaches a first threshold or a multiple of the first threshold, the position of the trigger button 410 relative to the support 100 should be adjusted to ensure that the second free end 310 of the second arm portion 300 can trigger the trigger button 410 when the wear amount of the brake magnet 32 reaches a multiple of the first threshold again.

In addition, with the gradual increase of the wear amount of the brake magnet 32, when the wear amount reaches the second threshold, it may make the brake magnet 32 unable to be normally attracted to or separated from the brake disc 31, so that the brake device 30 can no longer function normally, and it may be necessary to replace the brake device at this time. Therefore, it is necessary to monitor this second threshold.

Figure 3:
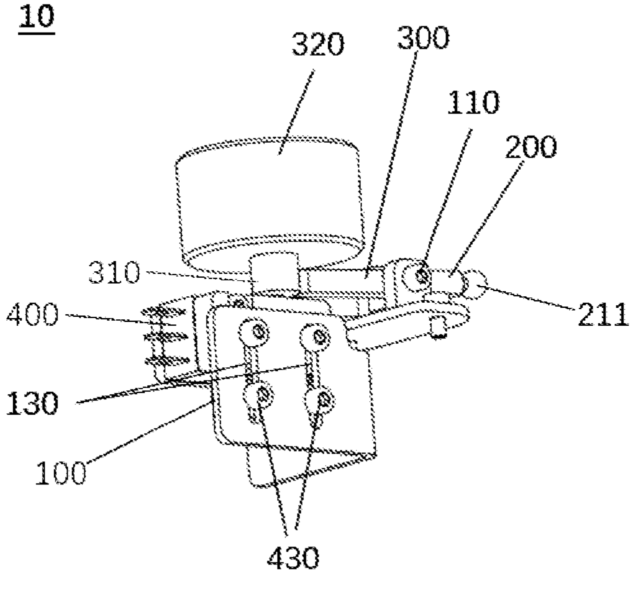
FIG. 3 is a second perspective view of the wear monitoring system in FIG. 1.

To this end, as shown in FIGS. 3 and 5, in some embodiments, the trigger device 400 may be arranged to be displaceable relative to the support 100, for example, manually. In a variation, the trigger button 410 can be displaced together with the trigger device 400. More specifically, the trigger device 400 is configured to be able to be displaced with respect to the support 100 by a displacement amount associated with the first threshold value after the trigger button 410 is triggered each time. For example, the displacement amount may be approximately: (the length of the second arm portion 300×the first threshold)/the length L1 of the first arm portion. In a more specific embodiment, the wear monitoring system 10 may further include a fixed positioning block 600, which is, for example, arranged on the support 100, and is provided such that when the trigger device 400 is displaced to a position contacting the positioning block 600, it indicates that the wear amount of the brake magnet 32 has reached a second threshold. Therefore, the arrival of the second threshold can be accurately and effectively monitored by the positioning block 600 in a simple manner, thereby saving manual measurement and cost.

In some embodiments, as shown in FIGS. 3 and 5, the support 100 may be provided with a first guide part 130, and the trigger device 400 may be provided with a second guide part 430 that may cooperate with the first guide part 130 to move the trigger device 400 relative to the support 100. More specifically, the first guide part 130 is a groove or a screw, and the second guide part 430 is a screw or a groove accordingly. In this case, a screw or groove may also be provided for fixing the trigger device 400 with respect to the support 100 in an initial state or every time the trigger device 400 is displaced.

Figure 6:
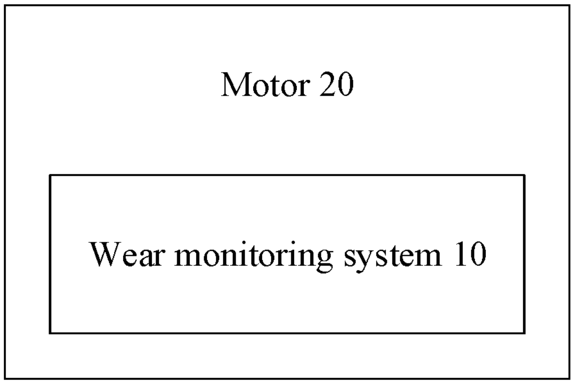
FIG. 6 is a schematic diagram of a motor according to an embodiment of the present disclosure.

According to a second aspect of the present invention, referring to FIG. 6, a motor 20 is proposed, which may include the wear monitoring system 10 according to the foregoing.

Figure 7:
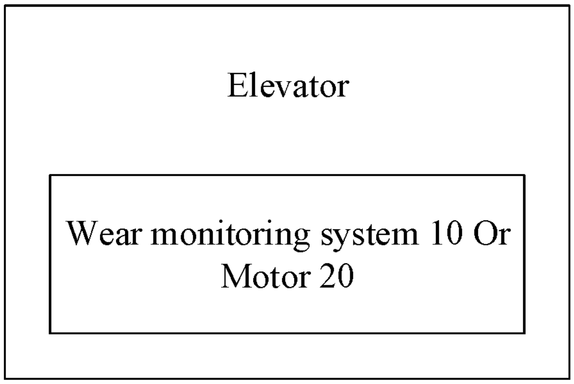
FIG. 7 is a schematic diagram of an elevator according to an embodiment of the present disclosure.

According to a third aspect of the present invention, referring to FIG. 7, an elevator is proposed, which may include the wear monitoring system 10 or the motor 20 according to the foregoing. In some embodiments according to the third aspect of the present invention, as described above, in the elevator, the trigger button 410 may be associated with the safety circuit of the elevator, and when the trigger button 410 is triggered, the safety circuit functions to stop the elevator.

The exemplary implementations of the wear monitoring system proposed by the present invention has been described in detail above with reference to the preferred embodiments, but it is understood by those skilled in the art that without departing from the concept of the present invention, various modifications and variations can be made to the above specific implementations, and various technical features and structures proposed by the present invention can be combined in various ways without exceeding the protection scope of the present invention.

The scope of the present disclosure is not limited by the above-described embodiments, but by the appended claims and their equivalents.

LIST OF REFERENCE SIGNS

10 wear monitoring system
100 support
110 axle pin
130 the first guide part
200 the first arm portion
210 the first free end
211 ball
300 the second arm portion
310 the second free end
320 counterweight
400 trigger device
410 trigger button
430 the second guide part
500 positioning component
600 positioning block
20 motor
21 housing
30 brake device
31 brake disc
32 brake magnet
321 bottom

The invention claimed is:

1. A wear monitoring system for a brake device of a motor, the brake device comprising a fixed brake disc and a brake magnet, wherein the brake magnet is movable relative to the brake disc to switch between an attracted state in which the brake magnet is attracted to the brake disc and a separated state in which the brake magnet is separated from the brake disc, wherein the wear monitoring system comprises:

a fixedly arranged support;

a first arm portion including a first free end and arranged to be moved with the brake magnet so that the first free end always contacts the bottom of the brake magnet, a second arm portion arranged to be moved with the first arm portion and including a second free end, a trigger device comprising a trigger button which is set to be triggered by the second free end of the second arm portion when the wear amount of the brake magnet reaches a first threshold or a multiple of the first threshold and is smaller than a second threshold larger than the first threshold, and when the brake magnet and the brake disc are in the attracted state.

2. The wear monitoring system according to claim 1, further comprising an adjustable positioning member for defining a separation position of the brake magnet in the separation state.

3. The wear monitoring device according to claim 2, wherein when the brake magnet is not worn, in the separated state, the brake magnet is separated from the brake disc by a first distance; and wherein, after the trigger button is triggered every time, the positioning member is adjusted by the first threshold value, so that the brake magnet and the brake disc are separated by the first distance in the separated state.

4. The wear monitoring system according to claim 3, wherein the trigger device is arranged to be able to be displaced relative to the support by a displacement amount associated with the first threshold value each time the trigger button is triggered.

5. The wear monitoring system according to claim 4, further comprising a fixed positioning block, wherein the positioning block is provided such that when the trigger device is shifted to a position contacting the positioning block, the wear amount of the brake magnet reaches the second threshold.

6. The wear monitoring system according to claim 4, wherein the first arm portion and the second arm portion are both integrally formed parts of a single arm that is arranged to be able to pivot around an axle pin fixedly arranged on the support, so as to generate the movement of the second arm portion with the first arm portion.

7. The wear monitoring system according to claim 6, wherein the length of the first arm portion is shorter than the length of the second arm portion.

8. The wear monitoring system according to claim 7, wherein a counterweight is provided at the second free end, and configured to apply a trigger force for triggering the trigger button.

9. The wear monitoring system according to claim 1, wherein the first free end is provided with a ball that contacts the bottom of the brake magnet.

10. The wear monitoring system according to claim 4, wherein the support is provided with a first guide part and the trigger device is provided with a second guide part cooperating with the first guide part so as to move the trigger device relative to the support.

11. The wear monitoring system according to claim 10, wherein the first guide part is a groove or a screw, and the second guide part is a screw or a groove accordingly.

12. The wear monitoring system according to claim 2, wherein the positioning member is a screw that can be screwed in and out with respect to a housing of the motor.

13. The wear monitoring system according to claim 1, wherein the first threshold is 0.5 mm and/or the second threshold is 2.1 mm.

14. A motor comprising a wear monitoring system for a brake device of the motor, the brake device comprising a fixed brake disc and a brake magnet, wherein the brake magnet is movable relative to the brake disc to switch between an attracted state in which the brake magnet is attracted to the brake disc and a separated state in which the brake magnet is separated from the brake disc, wherein the wear monitoring system comprises:

a fixedly arranged support;

a first arm portion including a first free end and arranged to be moved with the brake magnet so that the first free end always contacts the bottom of the brake magnet, a second arm portion arranged to be moved with the first arm portion and including a second free end, a trigger device comprising a trigger button which is set to be triggered by the second free end of the second arm portion when the wear amount of the brake magnet reaches a first threshold or a multiple of the first threshold and is smaller than a second threshold larger than the first threshold, and when the brake magnet and the brake disc are in the attracted state.

15. An elevator comprising a wear monitoring system for a brake device of a motor, the brake device comprising a fixed brake disc and a brake magnet, wherein the brake magnet is movable relative to the brake disc to switch between an attracted state in which the brake magnet is attracted to the brake disc and a separated state in which the brake magnet is separated from the brake disc, wherein the wear monitoring system comprises:

a fixedly arranged support;

a first arm portion including a first free end and arranged to be moved with the brake magnet so that the first free end always contacts the bottom of the brake magnet, a second arm portion arranged to be moved with the first arm portion and including a second free end, a trigger device comprising a trigger button which is set to be triggered by the second free end of the second arm portion when the wear amount of the brake magnet reaches a first threshold or a multiple of the first threshold and is smaller than a second threshold larger than the first threshold, and when the brake magnet and the brake disc are in the attracted state.

16. The elevator according to claim 15, wherein the trigger button is associated with a safety circuit of the elevator, and when the trigger button is triggered, the safety circuit functions to stop the elevator.

* * * * *